Figure 1:
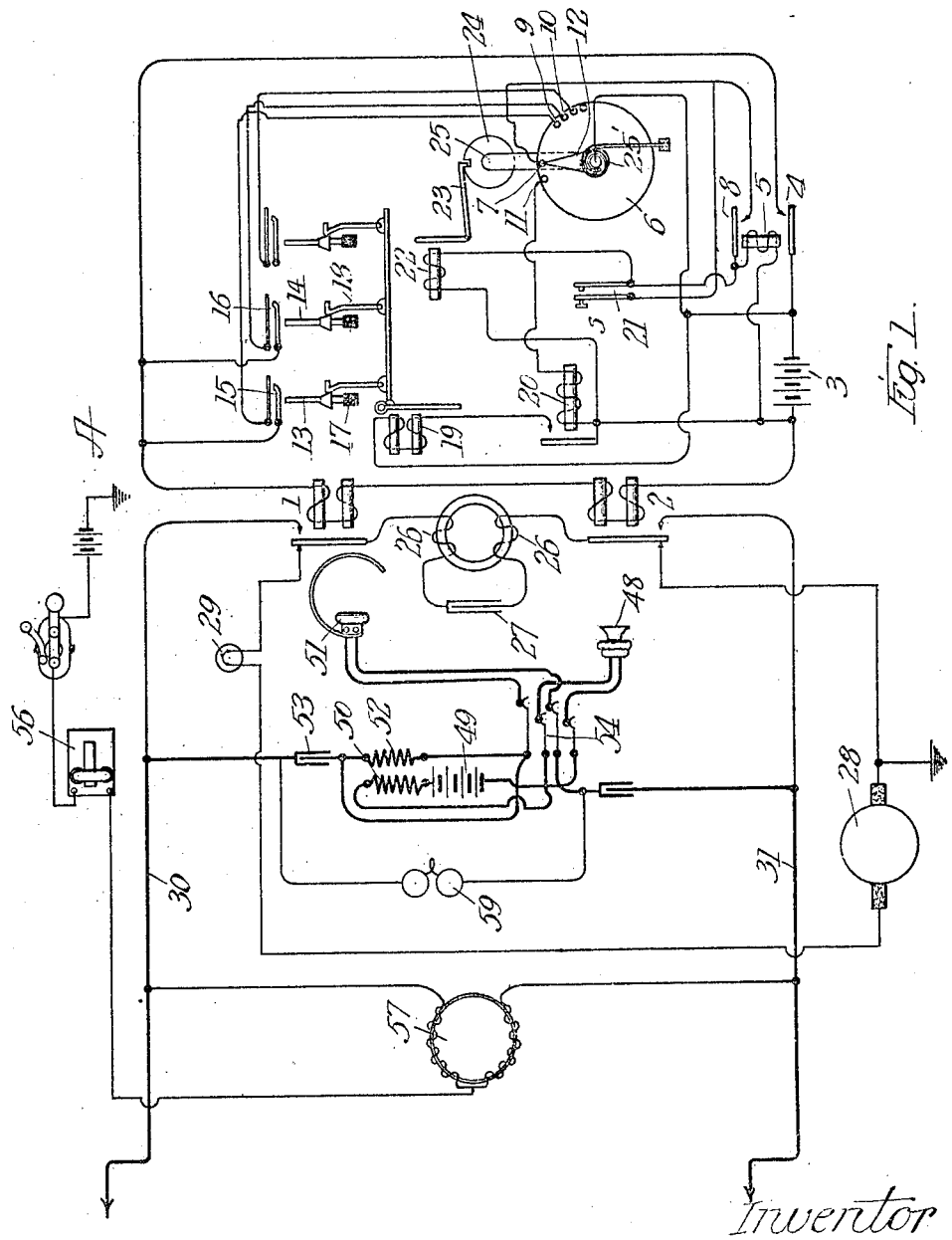

A. WRAY.
TRANSMISSION SYSTEM.
APPLICATION FILED OCT. 2, 1915. RENEWED SEPT. 12, 1917.

1,292,208.

Patented Jan. 21, 1919.
2 SHEETS—SHEET 1.

Inventor
Archibald Wray
By: G. L. Cragg Atty.

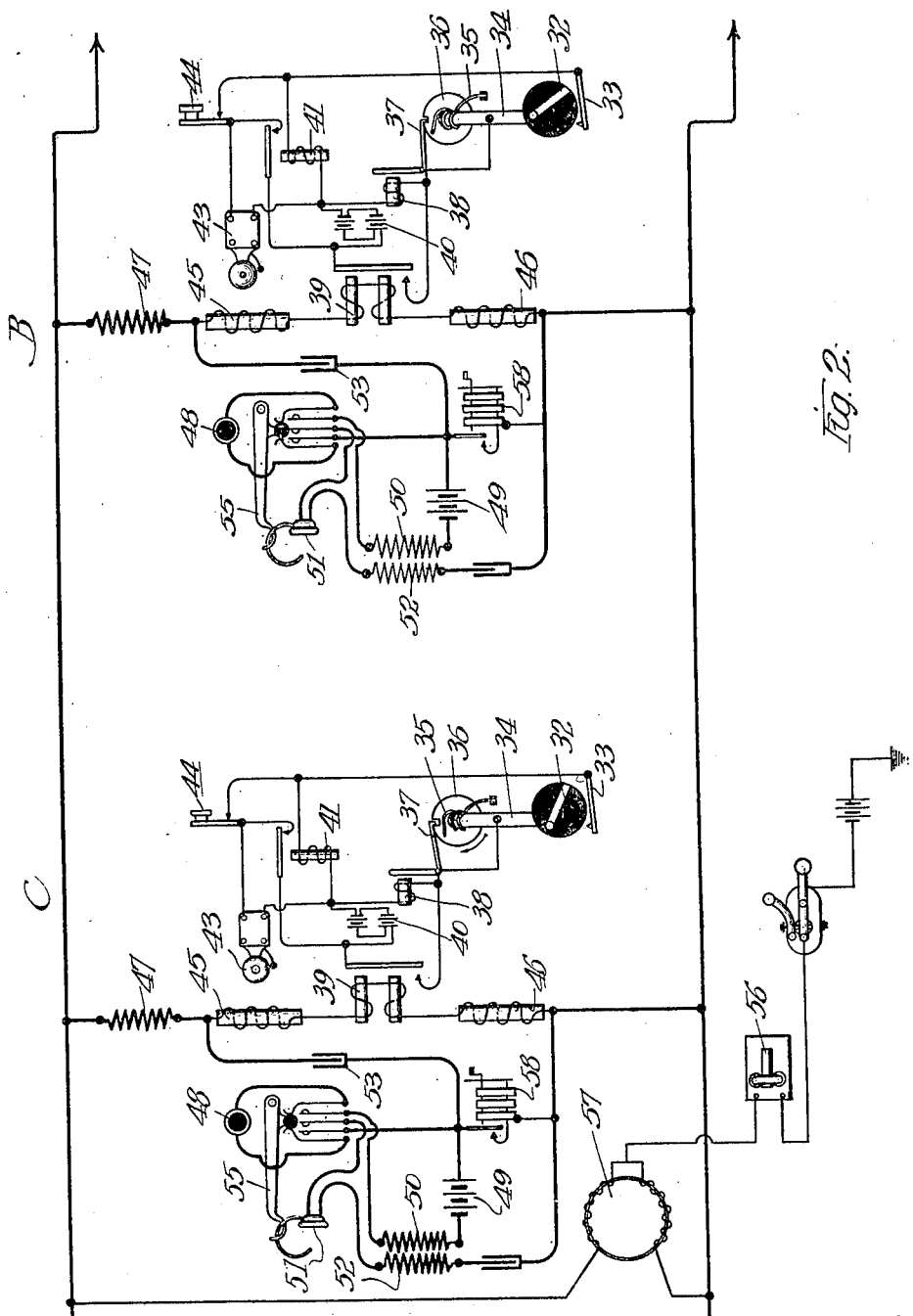

UNITED STATES PATENT OFFICE.

ARCHIBALD WRAY, OF PARK RIDGE, ILLINOIS, ASSIGNOR TO WESTERN ELECTRIC COMPANY, INCORPORATED, OF NEW YORK, N. Y., A CORPORATION OF NEW YORK.

TRANSMISSION SYSTEM.

1,292,208.   Specification of Letters Patent.   Patented Jan. 21, 1919.

Application filed October 2, 1915, Serial No. 53,683. Renewed September 12, 1917. Serial No. 191,062.

*To all whom it may concern:*

Be it known that I, ARCHIBALD WRAY, citizen of the United States, residing at Park Ridge, in the county of Cook and State of Illinois, have invented a certain new and useful Improvement in Transmission Systems, of which the following is a full, clear, concise, and exact description, reference being had to the accompanying drawings, forming a part of this specification.

My invention relates to systems of electrical transmission which require momentary impression of current upon transmission lines to operate apparatus located in connection therewith, and has for its object the provision of a substitute for batteries or power driven generators as they have hitherto been associated with line circuits for this purpose.

My invention finds a very useful embodiment in train despatching circuits that connect despatchers' offices with various stations, and in carrying out the invention, when thus embodied, I place a condenser of suitable capacity in normally open bridge of the associate transmission line and provide means for charging the condenser when in such open circuit. When a substation upon the line is to be signaled from the main or despatcher's office, the normally open bridge is closed to permit the condenser to discharge upon the line and operate apparatus at the wanted station to attract the attention of the operator located there. The means for thus governing the association of the condenser is desirably in the form of relay mechanism which is operated by the despatcher to cut out the charging generator and connect the condenser with the line. The apparatus at the substations responsive to the discharge of the condenser is desirably in bridge of the transmission line, the various bridges including adjusting resistance to make the pressure of the condenser current applied thereto substantially uniform, so that such current will be evenly divided among the bridges.

I will explain my invention by reference to the accompanying drawings in which Figures 1 and 2 taken collectively show the preferred embodiment thereof as embodied in a train despatching system.

The despatcher's or transmitting station is indicated at A, the despatching equipment including a local circuit containing condenser controlling line relays 1, 2, a local battery 3, and the normally open armature switch 4 of a relay 5. A dial 6 is provided with a local contact 7 connected with the normally disengaged contact of an armature switch 8 of relay 5. Said dial also has contacts 9, 10, etc., individual to the substations or receiving stations of which two (B and C) are shown. The dial also has a restoring contact 11, and a spring motor driven clockwise moving wiper or arm 12 that sweeps over the dial contacts and rests normally in engagement with contact 7. Substation selecting keys 13 and 14 are respectively individual to the substations B and C, and their dial contacts 9, 10, as are also the switches 15, 16, controlled by said keys. The keys have detents 17, 18, that are respectively individual to the keys and keep them in depressed positions until the releasing magnet 19 disengages them, circuit being established through the releasing magnet by the releasing control magnet 20 when this latter magnet has its circuit closed upon the passage of the wiper 12 over the contact 11.

When a substation is to be selected, the key 13 or 14 individual thereto is depressed as is also the starting switch 21. The latter key closes circuit through the starting magnet 22 that withdraws the detent 23 from engagement with the catch 24 upon the spring operated shaft 25 which carries the wiper 12. When this detent and catch are disengaged, the spring 25' turns the wiper 12 until it engages the restoring contact 11, and instantly thereafter comes into resting engagement with the normal contact 7 as a consequence of the reëngagement of the detent and catch. When the wiper engages the contact (9 or 10, etc.) which is individual to the depressed key (13 or 14, etc.), the wanted substation is signaled. The armature switches of line relays 1 and 2 are connected through the windings 26 of a retardation coil, and a condenser 27 connected between the retardation coil windings. The normal contacts of these armature switches may be connected with any suitable source of charging current, such as a power driven generator 28, a resistance 29 being employed in sufficient amount to prevent these normal contacts from burning. The alternate contacts of the armature switches of relays 1 and 2 are connected with the different sides 30 and 31 of the transmission line. When these armature switches are attracted, the condenser charging circuit is opened and the condenser is connected across the line.

At each substation there is a switch comprising a revoluble contact 32 and a stationary spring contact 33. The contact 32 is mounted upon a shaft 34 driven by a spring 35. This shaft carries a stop 36 engaged by a detent 37. When a starting magnet 38 is energized, the detent is withdrawn to permit the shaft to turn one revolution when the stop and detent again engage, this portion of the equipment being similar to similarly illustrated equipment at the main or despatcher's office. The contacts 32 and 33 are differing distances apart at the substations, corresponding to the positions of the waiting contacts 9, 10, etc. The arrangement is such that when the wiper 12 engages the first substation contact 9, the contacts 32, 33, at one station only are in engagement; when the wiper 12 engages the next substation contact 10, the contacts 32, 33, at another substation only, are in engagement, etc. A line or starting control relay 39 is provided in bridge of the transmission line at each substation, each of the relays 39 on the line being energized twice in each selecting operation consequent upon two energizations of relays 1 and 2. The first energization of relays 39 energizes all starting magnets 38 by including them in local circuits with the armature switches of relays 39 and the batteries 40. Such first energization of relays 39 is effected upon the closure of the starting switch 21 at the despatcher's office, that closes circuit through relay 5 that in turn closes circuit through the line relays 1 and 2 at the armature switch 4, whereby the condenser is included in bridge of the line to effect the first operation of all relays 39. The circuit thus established through relay 5 includes the contact 7 and the wiper 12 normally engaging it. As the wiper is immediately stepped from contact 7 owing to the establishment of the circuit for the starting magnet 22 through the battery 3, starting key 21, contact 7 and wiper 12, the circuit through the line relays 1 and 2 is broken after the first energization of relays 39. The second energization of relays 39 occurs when the line relays 1 and 2 are themselves energized the second time, a result which occurs when the wiper 12 closes circuit through the contact (9 or 10, etc.) connected with the employed key (13 or 14, etc.) individual to the wanted substation, the established circuit including the wiper, the selected contact 9 or 10, the employed switch 15 or 16, the relays 1 and 2, battery 3 and the wiper. In the interval between the two energizations of relays 1 and 2, the armature switches of these relays remain in connection with their normal contacts to permit the generator 28 again to charge the condenser 27, so that when the relays 1 and 2 are again energized, the condenser will be connected in discharging relation with the line for the second time, and when the contacts 32 and 33 at the wanted substation are in engagement, the contacts 32 and 33 at all other stations being then out of engagement. As a result of the second discharge of the condenser, all relays 39 are energized for the second time, but only the relay 39 at the wanted station functions, this particular relay closing its armature switch when the contacts 32 and 33 at the wanted station are closed, with the result that relay 41 (at the selected station only) is included in its energizing circuit that contains the battery 40, the armature switch of relay 39 at the selected station, and the engaged contacts 32 and 33 at this station. The armature switch of the energized relay 41 establishes a local circuit through the signal bell or responsive device 43 and battery 40 at the selected station, this armature switch also establishing a locking circuit for this relay that includes battery 40, winding of relay 41, the circuit breaking key 44 and the armature switch of relay 41. When the operator at the signaled substation responds, he operates key 44 to open the locking circuit of relay 41 to complete the restoration of the signaling equipment to normal, the contact 32 (in company with the contacts 32 at unselected stations) being restored to normal independently as the magnets 38 are deënergized immediately after their energization, owing to the retraction of the armature switches of relays 39, whereby the detents 37 are at liberty to engage their stops 36 when the shafts 34 have each completed a revolution. The bridges having the relays 39 desirably have impedance coils 45, 46, one upon each side of a relay 39. These bridges may also include adjusting resistances 47 for the purpose of equalizing the pressure upon the bridges of the current discharged from the condenser 27.

The transmission line 30, 31, is shown in the form of a telephone line, there being at the despatcher's office and each of the substations a local circuit including a telephone transmitter 48, a talking battery 49 and a primary coil 50. There is also at each station a telephone receiver 51 in bridge, or adapted to be included in bridge, of the main line 30, 31, and in series with a secondary 52 and local condenser 53. At the main office the associations of the telephone receiver and transmitter are governed by a spring jack 54, and at each substation by a telephone switch hook 55.

Telegraphic equipment may also be associated with the line. I have illustrated simplex instruments 56 in grounded branches of main line bridges that include retardation coils 57. The substations may be provided with hand generators 58 for operating the call bell 59 at the despatcher's office.

The set of batteries which the condenser 27 replaces is duplicated and usually requires annual or semi-annual renewal. The condenser is about of the cost of one set of batteries and does not require renewal. The generator for charging the condenser does not need to be connected in circuit long, and as the current may usually be secured from some lighting circuit, no investment in a generator is required, while the charge from the lighting company for current consumed is small.

While I have herein shown and particularly described the preferred embodiment of my invention, I do not wish to be limited thereto, but having thus described my invention, I claim as new and desire to secure by Letters Patent the following:—

1. A transmission system including a transmission line extending from a transmitting station to a plurality of receiving stations; responsive devices at the receiving stations; one set of instrumentalities distributed among the receiving stations and performing their functions in succession and having partial control of said responsive devices; a second set of instrumentalities connected with the line and distributed among the receiving stations and in starting relation to and coöperating with the aforesaid instrumentalities in controlling said responsive devices; controlling relay mechanism at the transmitting station end of the transmission line; a condenser; a condenser charging source of current; switching mechanism controlled by the controlling relay mechanism and permitted by the controlling relay mechanism when idle to include the condenser in circuit with said charging source of current, and operated by the controlling relay mechanism, when employed, to exclude the condenser from such circuit and include it in circuit with the line; switching mechanism at the transmitting station for operating the controlling relay mechanism to connect the condenser with the line for operating the instrumentalities of the second set to start the instrumentalities of the first set; and a receiving station selecting switching mechanism at the transmitting station for operating the controlling relay mechanism a second time to connect the condenser with the line a second time again to operate the instrumentalities of the second set to enable the one thereof at the selected station to coöperate with the companion instrumentality in operating the associate responsive device.

2. A transmission system including a transmission line extending from a transmitting station to a plurality of receiving stations; responsive devices at the receiving stations; one set of instrumentalities distributed among the receiving stations and performing their functions in succession and having partial control of said responsive devices; a second set of instrumentalities connected with the line and distributed among the receiving stations and in starting relation to and coöperating with the aforesaid instrumentalities in controlling said responsive devices; controlling relay mechanism at the transmitting station end of the transmission line; a condenser; a condenser charging source of current; switching mechanism controlled by the controlling relay mechanism to include the condenser in circuit with the charging source of current; switching mechanism at the transmitting station for operating the controlling relay mechanism to connect the condenser with the line for operating the instrumentalities of the second set to start the instrumentalities of the first set; and a receiving station selecting switching mechanism at the transmitting station for operating the controlling relay mechanism a second time to connect the condenser with the line a second time again to operate the instrumentalities of the second set to enable the one thereof at the selected station to coöperate with the companion instrumentality in operating the associate responsive device.

3. A transmission system including a transmission line extending from a transmitting station to a plurality of receiving stations; responsive devices at the receiving stations; one set of instrumentalities distributed among the receiving stations and performing their functions in succession and having partial control of said responsive devices; a second set of instrumentalities connected with the line and distributed among the receiving stations and in starting relation to and coöperating with the aforesaid instrumentalities in controlling said responsive devices; controlling mechanism at the transmitting station end of the transmission line; a condenser; a condenser charging source of current; switching mechanism controlled by the controlling mechanism and permitted by the controlling mechanism when idle to include the condenser in circuit with said charging source of current, and operated by the controlling mechanism, when employed, to exclude the condenser from such circuit and include it in circuit with the line; switching mechanism at the transmitting station for operating the controlling mechanism to connect the condenser with the line for operating the instrumentalities of the second set to start the instrumentalities of the first set; and a receiving station selecting switching mechanism at the transmitting station for operating the controlling mechanism a second time to connect the condenser with the line a second time again to operate the instrumentalities of the second set to enable the one thereof at the selected station to coöperate with the companion instrumentality in operating the associate responsive device.

4. A transmission system including a transmission line extending from a transmitting station to a plurality of receiving stations; responsive devices at the receiving stations; one set of instrumentalities distributed among the receiving stations and performing their functions in succession and having partial control of said responsive devices; a second set of instrumentalities connected with the line and distributed among the receiving stations and in starting relation to and coöperating with the aforesaid instrumentalities in controlling said responsive devices; controlling mechanism at the transmitting station end of the transmission line; a condenser; a condenser charging source of current; switching mechanism controlled by the controlling mechanism to include the condenser in circuit with the charging source of current; mechanism at the transmitting station for operating the controlling mechanism to connect the condenser with the line for operating the instrumentalities of the second set to start the instrumentalities of the first set; and a receiving station selecting switching mechanism at the transmitting station for operating the controlling mechanism a second time to connect the condenser with the line a second time again to operate the instrumentalities of the second set to enable the one thereof at the selected station to coöperate with the companion instrumentality in operating the associate responsive device.

In witness whereof, I hereunto subscribe my name this 20th day of September, A. D. 1915.

ARCHIBALD WRAY.

Witnesses:
G. L. CRAGG,
M. S. ROSENZWEIG.

Copies of this patent may be obtained for five cents each, by addressing the "Commissioner of Patents, Washington, D. C."